July 17, 1928.  1,677,243

N. D. LEVIN

ELECTRIC CONTROLLER

Filed Dec. 30, 1920  3 Sheets-Sheet 1

WITNESSES:
R. D. Nichols
Dudley T. Fisher

INVENTOR
Nils D. Levin
BY
H. H. Bliss
ATTORNEY

July 17, 1928.  
N. D. LEVIN  
ELECTRIC CONTROLLER  
Filed Dec. 30, 1920  
1,677,243  
3 Sheets-Sheet 2

WITNESSES:
R. D. Nichols
Dudley F. Fisher

INVENTOR
Nils D. Levin
H. H. Bliss
ATTORNEY

July 17, 1928.  
N. D. LEVIN  
ELECTRIC CONTROLLER  
Filed Dec. 30, 1920  
1,677,243  
3 Sheets-Sheet 3

Patented July 17, 1928.

1,677,243

UNITED STATES PATENT OFFICE.

NILS D. LEVIN, OF COLUMBUS, OHIO, ASSIGNOR TO THE JEFFREY MANUFACTURING COMPANY, OF COLUMBUS, OHIO, A CORPORATION OF OHIO.

ELECTRIC CONTROLLER.

Application filed December 30, 1920. Serial No. 434,075.

The present invention relates to certain new and useful improvements in electric controllers adapted to control the motors of an electric locomotive.

The especial object of this invention is to provide a conveniently operable self contained controller adapted to use in the gas infested atmosphere of coal or other mines, wherein all of the exposed electrically charged parts of the apparatus are enclosed within an explosion proof casing to prevent the ignition of the surrounding gaseous atmosphere by the electric arcs formed during the operation of such controllers.

The devices by which I attain this object are fully set forth in the following specification reference being had to the accompanying drawings of which Fig. 1 is a front elevation of the preferred embodiment of my invention, the front cover being removed, and certain parts broken away to reveal other parts.

Like numerals refer to similar parts in the several figures.

Figure 1:
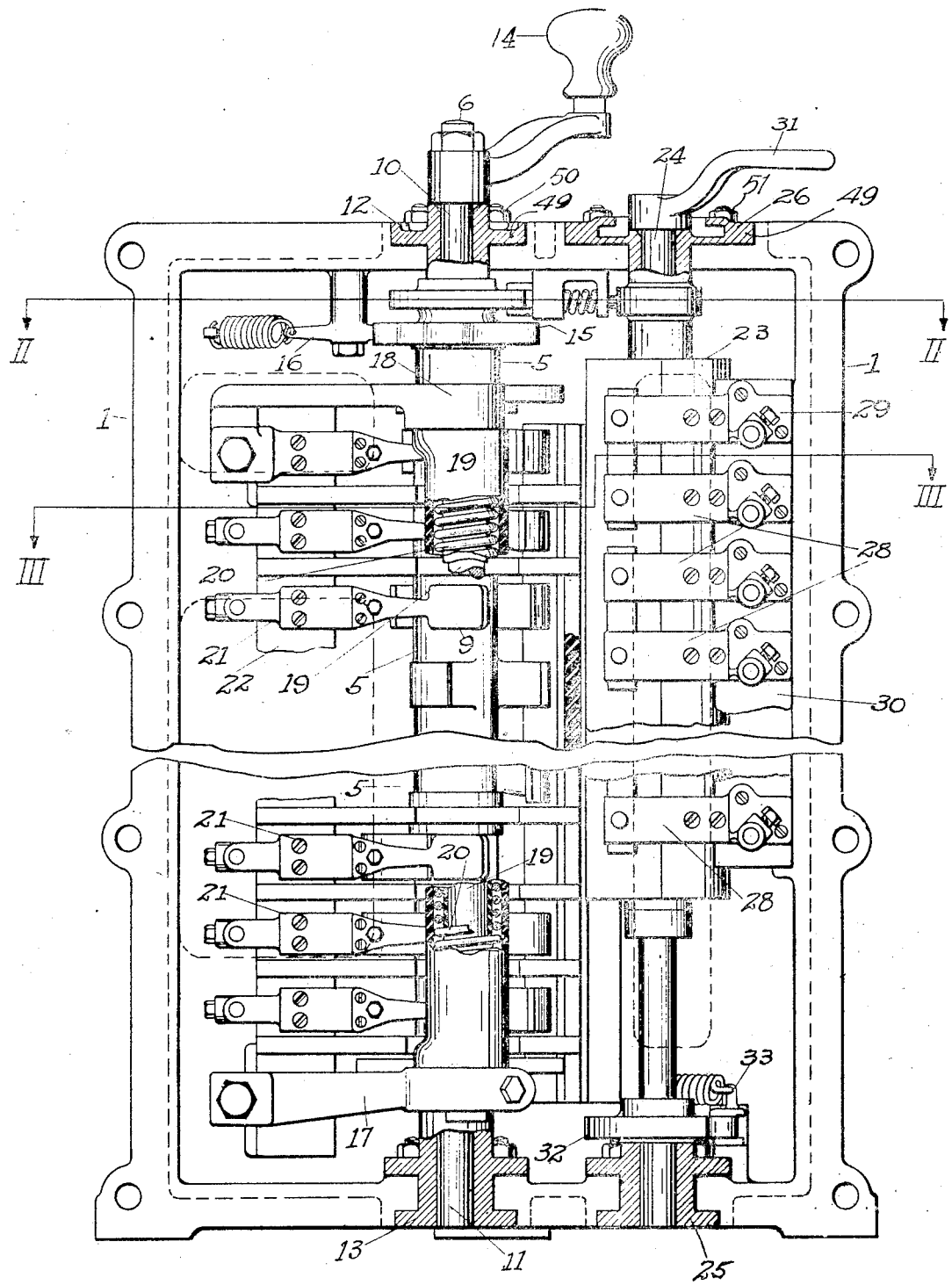
Figure 2:
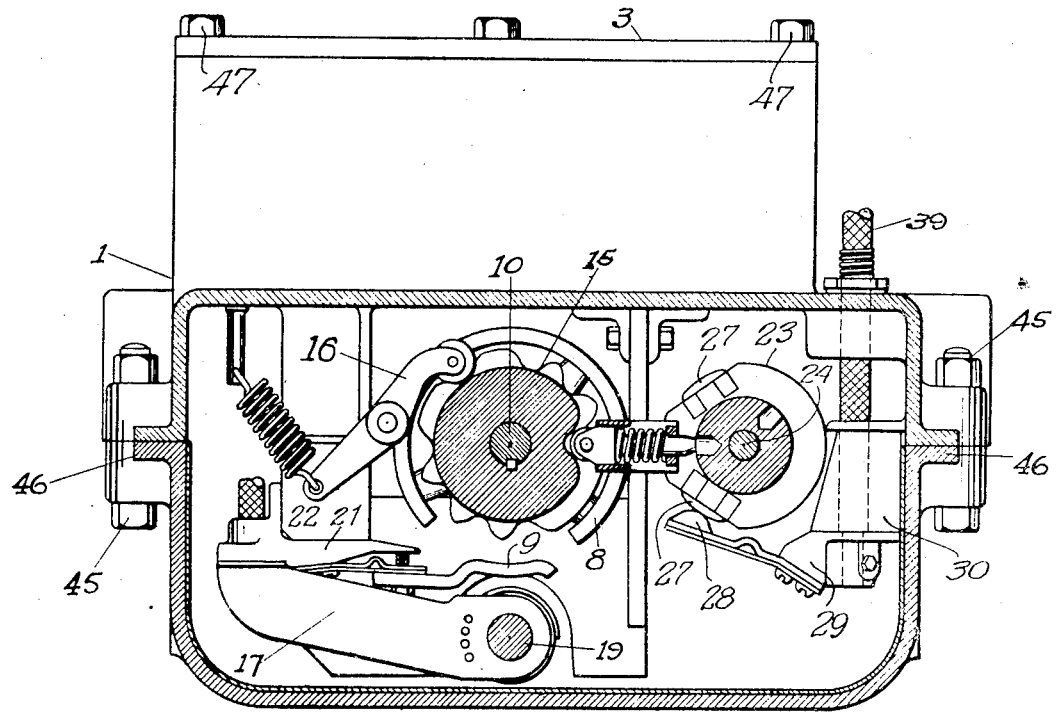
Fig. 2 is a sectional view taken along the line II—II of Fig. 1.
Figure 2:
Figure 3:
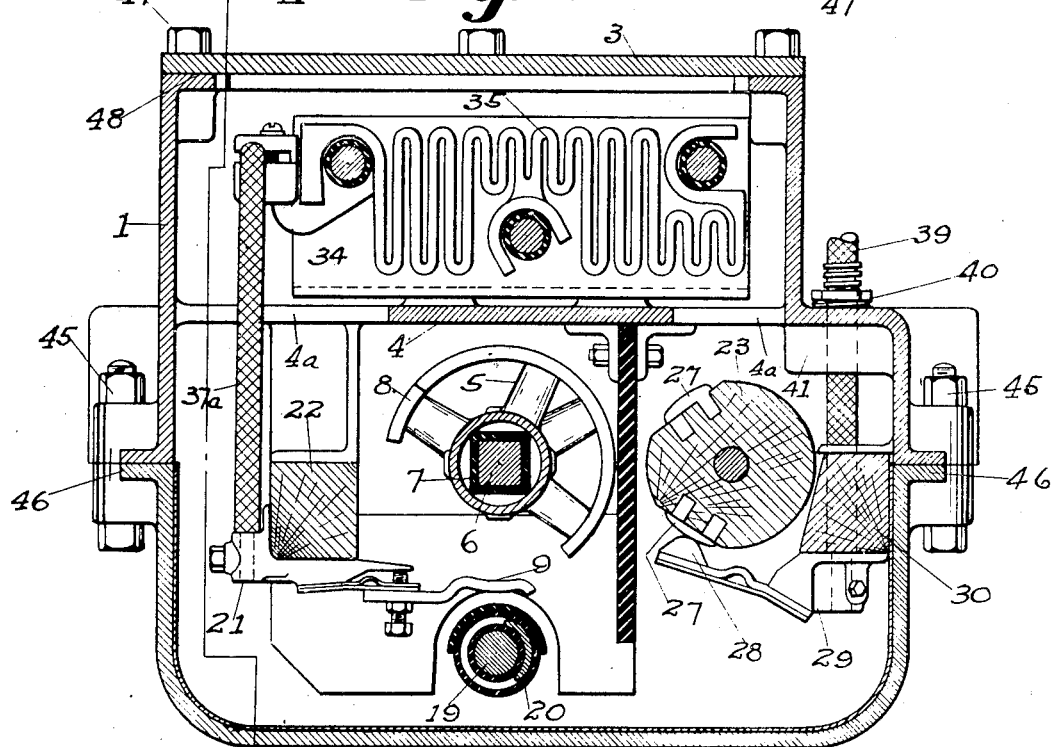
Fig. 3 is a sectional view taken along the line III—III of Fig. 1.
Figures 4, 5, 6:
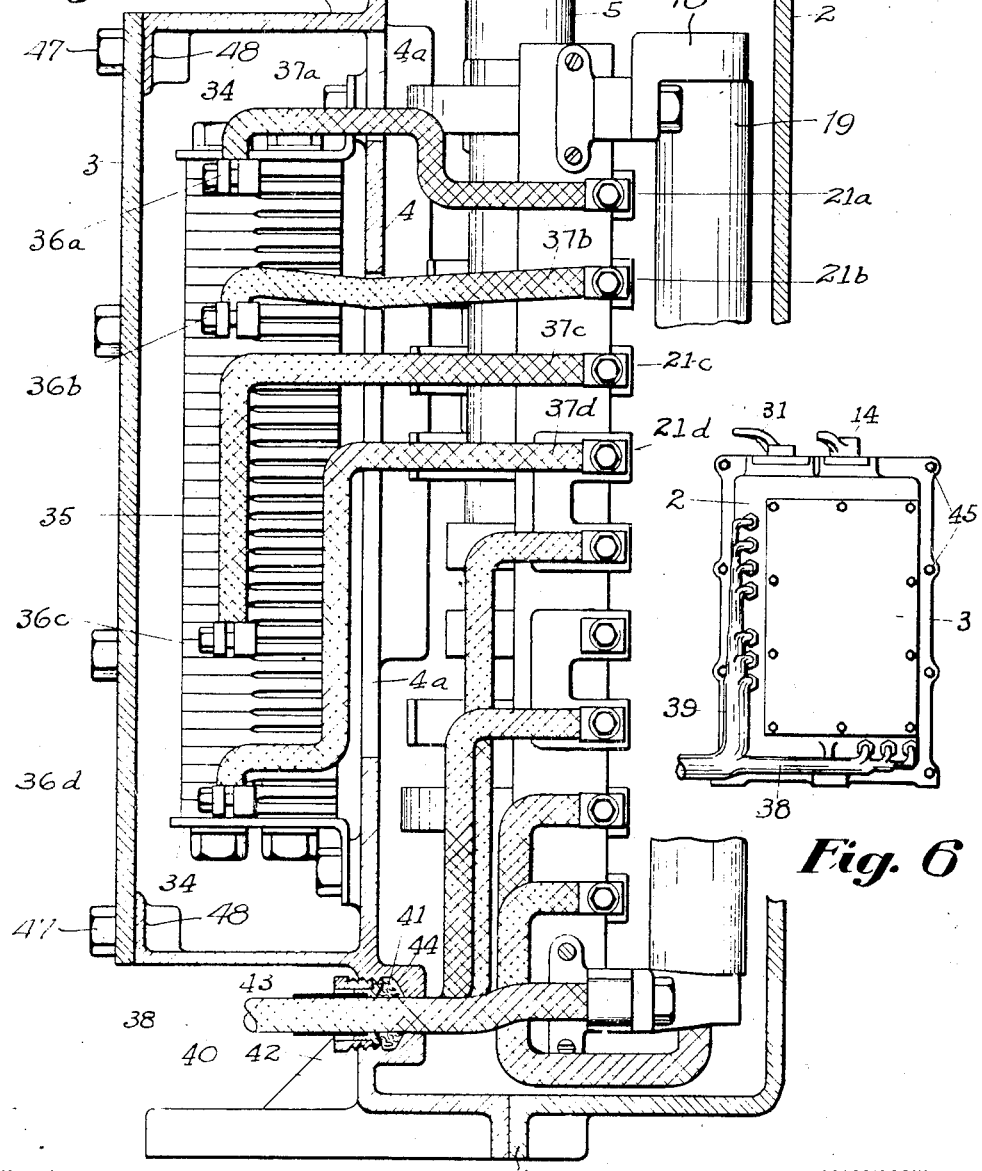
Fig. 4 is a sectional view taken along the line IV—IV of Fig. 3.
Fig. 5 is a fragmentary detail of the journal bearings which support the shafts of the commutating and reverse cylinders of the controller.
Fig. 6 is a rear elevation of the controller.

Under some circumstances the atmosphere of a coal mine becomes so charged with inflammable gases that the danger of explosion resulting from its ignition by electric arcs formed in the controlling devices constitutes a menace which seriously restricts the use of electric apparatus in mines. By enclosing all of the electrically charged parts of the apparatus within gas tight casings this menace may be entirely removed. Long exposure to a gas charged atmosphere, however, may cause the atmosphere within such a casing to become inflammable and I have provided means to prevent the ignition of the external atmosphere by an internal explosion.

The controller comprises a rotatable commutating cylinder having renewable contact segments adapted to contact with stationary brushes to connect the conductors of a locomotive into suitable combinations of circuits to effect the starting and stopping and to regulate the speed of the locomotive, a blow out magnet arranged in suitable proximity to the points of contact of the brushes with the segments of the commutating cylinder, and adapted to extinguish the arcs formed by the interruption of the circuits at these points, a plurality of resistance units arranged to be connected into the circuits to control the flow of electricity therethrough, a rotatable reverse cylinder having contact plates adapted to contact with stationary brushes to connect the conductors into suitable combinations to control the direction of rotation of the armatures of the motors and the consequent direction of travel of the locomotive, and suitable interlocking devices to prevent the rotation of either cylinder when the other is in a position which will produce an undesirable combination of circuits.

The parts above enumerated are mounted within a casing comprising a main frame casting 1, a front cover 2, and a rear cover plate 3, all of which are joined together with gas proof joints in the manner to be hereinafter described, and the parts are of such strength and rigidity that an internal explosion will not produce material deformation of the casing. The interior of the casing is divided into two compartments by a partition 4 in which are formed a plurality of apertures 4ª so positioned as to afford convenient passage for the conductors by which the devices in one compartment are connected with those in the other. In the event of an explosion in one of these compartments the pressure developed in that compartment causes the gases to flow through the apertures 4ª into the adjoining compartment, tending to compress the gases therein. At the same time flame transmitted through said apertures ignites these gases producing a secondary explosion. It is well known that the rapidity of combustion of an inflammable atmosphere, and the consequent violence of the resulting explosion, is increased by the compression of the inflammable gases. It is therefore desirable that this secondary explosion should occur before any material compression of the gases takes place and the apertures 4ᵃ are formed sufficiently large to permit the unretarded passage of flame from one compartment to the other.

The commutating cylinder is mounted in the forward compartment and is of the well known construction comprising a plurality of spider sections 5 mounted upon a square shaft 6 from which they are insulated by suitable insulators 7 in the manner well understood in the art. To the arms of the spider 5 are attached contact plates 8 of such lengths and so positioned as to contact with the corresponding brushes 9 at the appropriate steps of the rotation of the cylinder to produce the desired combination of connections.

A shaft 6 is square throughout the greater part of its length and is turned round near each end to form journals 10 and 11 which are rotatable in journal bearings 12 and 13 attached to the casing in a manner to be hereinafter described. To the extended upper end of the shaft 6 is attached a handle 14 for the manipulation of the commutating cylinder, and a suitable notched cam 15 arranged to be engaged by a spring pressed pawl 16 determines the points of rotation at which the cylinder will come to rest. As these devices are well understood in the art further description is not thought to be required at this time.

Supported in suitable proximity to the points of contact of the brushes 9 with the segments 8, by brackets 17 and 18 which are connected with the conductors of the circuit, is a blow out magnet comprising an elongated cylindrical magnet core 19 around which is wound a conductor 20. The conductor 20 is insulated from the magnet core 19 but is electrically connected with the brackets 17 and 18, and the connections are such that the entire current flowing through the circuits of the controller passes through the conductor 20 to produce a magnetic field sufficient to extinguish the arcs formed by the interruption of the current as the commutating segments 8 leave the brushes 9. The magnetic blowout devices above referred to are fully described in my copending application Serial No. 132,686, filed November 21st, 1916, and as these devices form no part of the present invention further description of them at this time is not thought to be required.

The brushes 9 are resiliently attached to brush holders 21 which are supported upon an insulating block 22 attached to the partition wall 4 of the casing, and are provided with means for their connection with the conductors of the circuits in the manner common in controller practice.

The reverse cylinder is of the construction commonly used in controllers of this class, and consists of a wooden cylinder 23 mounted upon and concentric with a shaft 24 which is journaled in journal bearings 25 and 26 attached to the casing in a manner to be hereinafter described. Upon the surface of this cylinder 23 are fixed contact plates 27 which are adapted to contact with brushes 28 to connect them together in such combinations as may be necessary to produce the desired circuits in the wiring of the locomotive. The brushes are substantially similar to those used with the commutating cylinder and are resiliently attached to brush holders 29 supported upon an insulating block 30 attached to the casing. The brush holders 29 are adapted to be connected with the conductors of the circuit in the manner common in controller practice. To the projecting upper end of the shaft 24 is fixed an operating handle 31 for its convenient manipulation, and a suitable notched cam 32 adapted to be engaged by the spring pressed pawl 33 determines the points of rotation at which the cylinder will come to rest.

Mounted in the rearward compartment of the casing, and supported by suitable brackets 34 which are bolted to the partition 4, is a series of resistance grids 35 supported and arranged in the manner well understood in the art. Certain of these resistance grids are provided with connecting lugs 36ᵃ, 36ᵇ, 36ᶜ, and 36ᵈ by which they are connected with the appropriate brush holders 21ᵃ, 21ᵇ, 21ᶜ, and 21ᵈ of the commutating cylinder by conductor cables 37ᵃ, 37ᵇ, 37ᶜ, and 37ᵈ in the manner and for the purpose well understood in the art. Other conductors, such as 38 and 39 pass through the back walls 40 of the casing to connect the devices within the casing with the source of electric energy and with the motors which are to be controlled. These conductors are preferably bound into convenient cables disposed in the space afforded by the offset of the rear compartment of the casing to produce the back wall 40 as shown. Surrounding the apertures in the wall 40 through which these conductors pass there are formed bosses 41 having recesses 42 concentric with the apertures. Screw threaded into the recesses 42 are bushings 43 arranged to compress the flexible asbestos, or other fireproof packing, 44, to form gas tight joints about the conductors.

The front cover 2 is secured to the main frame casting 1 by a plurality of bolts 45 which extend through apertures in the flanges 46, and the rear cover plate 3 is similarly clamped in position by the machine screws 47 threaded into the inwardly extending flange 48 of the main frame. The axes of both the commutating and reverse cylinders lie in the plane of the front cover joint, and the abutting edges are recessed to snugly fit around the journal bearings 12, 13, 25 and 26. Formed on each of these journal bearings is the concentric circular flanges 49 and 50 through which extends attachment bolts 51 and 52 to secure the journal bearings to the main frame casting, and thus maintain the controller parts in operative relation while permitting the removal of the cover 2 for inspection and adjustment of the apparatus. It will be seen that by mounting the journal bearings in the manner shown and described, in the edges of the open front of the casing, and securing them to that casing by independent means, such as the bolts 51, the cover plate 2 may be taken off for inspection or repair of the elements within the casing, without disturbing or unseating any of those elements. This is possible because of the fact that the journal bearings and their supported parts are mounted at the edge of the casing in the plane of the joint between such casing and the cover. The abutting surfaces of the main frame, the covers, and the flanges of the journal bearings, are finished to form gas tight joints adapted to normally prevent access of inflammable gases from the external atmosphere to the interior of the casing. These parts are of sufficient strength and rigidity to prevent their rupture or deformation by the pressures produced by such explosions and the extension of the abutting surfaces, due to the width of the flanges, tends to so reduce the temperature of the outflowing gases as to insure against the propagation of flame from the interior of the casing to the external atmosphere.

By the arrangement of parts above described I have produced an electric controller especially adapted to the control of electric motors in the gaseous atmosphere of coal or other mines, wherein the operating parts are arranged convenient to the hand of the operator while all electrically charged devices liable to the formation of electric arcs during operation are protected against the possible ignition of the surrounding inflammable atmosphere.

What I claim is:

1. In an electric controller, the combination of a gas tight casing, rotatable elements mounted in said casing with portions projecting exteriorly thereof, a cover for said casing having abutting edges to form a gas tight joint, and journal bearings for said rotatable elements clamped between the abutting casing and cover edges so as to be supported thereby and to form therewith gas and flame proof joints.

2. In an electric controller, the combination of a gas tight casing, rotatable elements mounted in said casing with portions projecting exteriorly thereof, a cover for said casing having abutting edges to form a gas tight joint, journal bearings for said rotatable elements clamped between the abutting casing and cover edges so as to be supported thereby and to form gas and flame proof joints, and means independent of said clamping edges to secure said journal bearings in place.

3. In an electric controller, the combination of a gas tight casing, rotatable elements mounted in said casing with portions projecting exteriorly thereof, a cover for said casing having abutting edges to form a gas tight joint, and annular journal bearings for said rotatable elements clamped between the abutting casing and cover edges so as to be supported thereby and to form therewith gas and flame proof joints.

4. In an electric controller, the combination of a gas tight casing, rotatable elements mounted in said casing with portions projecting exteriorly thereof, a cover for said casing having abutting edges to form a gas tight joint, and annular flanged journal bearings for said rotatable elements clamped between the abutting casings and cover edges so as to be supported thereby and to form therewith gas and flame proof joints.

5. In an electric controller, the combination of a gas tight casing, rotatable elements mounted in said casing with portions projecting exteriorly thereof, a cover for said casing having abutting edges to form a gas tight joint, annular flanged journal bearings for said rotatable elements clamped between the abutting casing and cover edges so as to be supported thereby and to form therewith gas and flame proof joints, and means independent of said clamping edges to secure the outer flanges of said journal bearings to said casing, to prevent rotation.

6. In an electric controller, the combination of an open front gas tight casing, journal bearings mounted at the edges of said casing, and a cover for said casing having abutting edges to clamp and support said bearings and form with the edges of said casing and said journal bearings a gas and flame proof joint.

7. In an electric controller, the combination of an open front gas tight casing, journal bearings mounted in the edges of said casing, flanges on the edges of said casing which embrace said journal bearings, and a cover having flanged edges abutting the flanged edges of said casing and engaging said journal bearings to clamp and support said bearings and form gas and flame proof joints.

8. The combination of a controller casing having an open front and back with flanged edges, and commutating and resistance element receiving chambers in said casing, journal bearings mounted at the edges of said open front, an apertured resistance supporting wall between said chambers, a front cover plate having flanged edges abutting the flanged edges of said casing to clamp and support said bearings and form a gas and flame proof joint with said casing and said journal bearings, and a back cover plate to close said resistance element chamber with a gas and flame proof joint.

9. In combination a controller casing comprising two chambers separated by a partition, each of said chambers having an open side, commutating and resistance elements in respective chambers and secured to opposite sides of said partition, conductors connecting said elements through enlarged apertures in said partition, and detachable gas-tight closure means for the open sides of said chambers.

10. In combination, a controller casing having an open front and rear and an intermediate partition, conductors connecting said elements through enlarged apertures in said partition, and detachable gas-tight closure means for the front and rear of said casing.

11. In an electric controller adapted for use in an inflammable gas charged atmosphere the combination with a casing, a cover secured to the casing, a cylinder within the casing, journal bearings clamped between and supported by said cover and said casing in which said cylinder is rotatably supported, and flanges formed upon the abutting edges of the casing, the cover, and the journal bearings, cooperating to form gas and flame proof joints.

12. In an electric controller adapted for use in an inflammable gas charged atmosphere, the combination with a casing, a cover secured to the casing, a cylinder within the casing, journal bearings clamped between and supported by said cover and said casing in which said cylinder is rotatably supported, means external of said casing to rotate said cylinder, and flanges formed upon the abutting edges of the casing, the cover, and the journal bearings, cooperating to form gas and flame proof joints.

13. In a controller adapted for use in an inflammable gas charged atmosphere, the combination with a casing, a cover secured to the casing, a cylinder within the casing, journal bearings attached to the casing and clamped between and supported by the cover and the casing in which said cylinder is rotatably supported, means external of said casing to rotate said cylinder, and flanges formed upon the abutting edges of the casing, the cover, and the journal bearings, cooperating to form gas proof joints.

14. In a controller comprising a commutating cylinder and a reverse cylinder mounted within an explosion proof casing, resistance elements mounted behind said commutating cylinder upon the back wall of said casing and enclosed within a secondary casing formed thereon, and a plurality of gas sealed apertures through said back wall behind said reverse cylinder for the passage of conductors to connect the devices within the casing with the external circuits.

15. In a controller comprising a commutating cylinder and a reverse cylinder mounted within an explosion proof casing, resistance elements mounted behind said commutating cylinder upon the back wall of said casing and enclosed within a secondary casing formed thereon, and a plurality of gas sealed apertures through said back wall along the side of and beneath said secondary casing for the passage of conductors to connect the devices within the casing with the external circuits.

16. In a controller comprising commutating devices mounted within an explosion proof casing, resistance elements mounted upon the back wall of said casing and enclosed within a secondary casing formed thereon, and a plurality of gas sealed apertures through said back wall external of said secondary casing for the passage of conductors to connect the devices within the casing with the external circuits.

17. In a controller comprising commutating devices mounted within an explosion proof casing, resistance elements mounted upon the back wall of said casing and enclosed within a secondary casing formed thereon, and apertures of communication through said back wall of sufficient size to permit the unretarded passage of flame from one compartment to the other.

18. In an electric controller adapted for use in an inflammable gas charged atmosphere, the combination with a casing, a cover secured to the casing, a cylinder within said casing, journal bearings clamped between and supported by said cover and said casing in which said cylinder is rotatably supported, and means external of said casing to rotate said cylinder.

19. In an electric controller adapted for use in an inflammable gas charged atmosphere, the combination with a casing, a cover secured to the casing, a cylinder within the casings, journal bearings attached to the casing and clamped between and supported by the cover and the casing in which said cylinder is rotatably supported, and means external of said casing to rotate said cylinder.

20. In an electric controller, the combination with a casing, a cover secured to the casing, two parallel cylinders rotatably mounted within the casing and clamped and held in the plane of the joint between the casing and the cover, and means external of the casing to rotate the cylinders.

21. In an electric controller, the combination with a casing, a cover secured to the casing, two parallel cylinders rotatably mounted within the casing and having their axes in the plane of the joint between the casing and the cover, journal bearings for said cylinders clamped between and supported by said casing and said cover and arranged to form gas proof joints with the axes of the cylinders and with the casing and its cover, and means external of the casing to rotate the cylinders.

In testimony whereof, I affix my signature.

NILS D. LEVIN.